United States Patent [19]
Orenstein

[11] Patent Number: 5,906,348
[45] Date of Patent: May 25, 1999

[54] BEVERAGE HOLDER FOR A VIDEO MONITOR

[76] Inventor: Adam M. Orenstein, 824 VanBuren St., Baldwin, N.Y. 11510

[21] Appl. No.: 09/001,132

[22] Filed: Dec. 30, 1997

[51] Int. Cl.⁶ .................................................. A47K 1/08
[52] U.S. Cl. ........................................ 248/311.2; 248/918
[58] Field of Search ............................ 248/311.2, 315, 248/918, 442.2; 312/7.7, 204; 348/836; 224/549

[56] References Cited

U.S. PATENT DOCUMENTS

| | | | |
|---|---|---|---|
| 4,828,211 | 5/1989 | McConnell et al. | 248/311.2 |
| 4,958,907 | 9/1990 | Davis | 248/918 X |
| 4,984,722 | 1/1991 | Moore | 224/549 |
| 5,167,392 | 12/1992 | Henricksen | 248/311.2 |
| 5,318,266 | 6/1994 | Liu | 248/311.2 |
| 5,385,327 | 1/1995 | Hegarty et al. | 248/442.2 |
| 5,423,508 | 6/1995 | Isenga et al. | 248/311.2 |
| 5,533,697 | 7/1996 | Fletcher et al. | 248/146 |
| 5,615,854 | 4/1997 | Nomura et al. | 248/918 X |

FOREIGN PATENT DOCUMENTS 6-270730  9/1994  Japan .
WO 92/11793  7/1992  WIPO .

*Primary Examiner*—Ramon O. Ramirez
*Attorney, Agent, or Firm*—Richard C. Litman

[57] ABSTRACT

A beverage holder for a video monitor, such as a computer monitor, a laptop computer monitor, a television, etc. The beverage holder is either formed integrally with the video monitor or is removably attachable to the video monitor. Several embodiments of a beverage holder are described. Each embodiment includes a generic video monitor with an integral or removably attachable beverage holder for supporting a beverage container which could include a variety of hot or cold beverages, such as a cup or mug, or a can of the type used with soft drinks, beer and other beverages which are normally chilled before being served and consumed. The beverage holder is generally in the form of a relatively thin surface of firm material. For example, the beverage holder may be insertable into a slot in the side wall or underneath the video monitor where it can be secured when not in use. The beverage holder may also be attached to a pivotable arm which may be attached to the top of the video monitor. Finally, the beverage holder may be integrally molded into the side wall of the video monitor in the form of a recessed slot which can receive a beverage container. The particular beverage holder geometry and dimensions are variable so as to suit the desires of the user.

15 Claims, 6 Drawing Sheets

BEVERAGE HOLDER FOR A VIDEO MONITOR

BACKGROUND OF THE INVENTION

1. FIELD OF THE INVENTION

The present invention relates generally to beverage holders, and more particularly, to integral and attachable cup holders for video monitors, such as computer monitors, laptop computer monitors, televisions, etc.

2. DESCRIPTION OF THE RELATED ART

Many people drink hot or cold beverages while watching a video monitor, such as a computer monitor, a laptop computer monitor, a television, etc., so a beverage container, such as a coffee mug or a pop can, is often placed within arm's reach near the video monitor. Coasters have long been used to protect furniture against the damage caused by moisture from cans, bottles and like containers. A vast majority of soft drinks, fruit juices, beer, wine coolers and other consumable beverages are sold in cans, bottles and other like containers which have been cooled either by refrigeration or immersion in ice cubes or ice water preparatory to being served. People are generally conditioned not to place a beverage container directly on a table top or desktop simply to avoid the risk of leaving water marks on the desktop. Particularly on fine furniture, a moist or dripping can or bottle can cause considerable damage through water stains, veneer separation, raised grain and discoloration of any table cloths or other coverings. It would be desirable for video monitors to be equipped with beverage holders.

The related art is represented by the following patents of interest.

U.S. Pat. No. 4,828,211, issued on May 9, 1989 to Deal McConnell et al., describes a beverage holder that can be mounted on the sides or walls of a vessel. McConnell et al. do not suggest a beverage holder for a video monitor according to the claimed invention.

U.S. Pat. No. 4,984,722, issued on Jan. 15, 1991 to Steven W. Moore, describes a beverage holder for use in automobiles. Moore does not suggest a beverage holder for a video monitor according to the claimed invention.

U.S. Pat. No. 5,167,392, issued on Dec. 1, 1992 to Douglas A. Henricksen, describes a beverage holder for use in automobiles. Henricksen does not suggest a beverage holder for a video monitor according to the claimed invention.

U.S. Pat. No. 5,318,266, issued on Jun. 7, 1994 to Hui-Long Liu, describes a collapsible beverage holder. Liu does not suggest a beverage holder for a video monitor according to the claimed invention.

U.S. Pat. No. 5,423,508, issued on Jun. 13, 1995 to Steven R. Isenga et al., describes a beverage holder for a moving vehicle. Isenga et al. do not suggest a beverage holder for a video monitor according to the claimed invention.

U.S. Pat. No. 5,533,697, issued on Jul. 9, 1996 to James R. Fletcher et al., describes a mouse pad with a hole formed through the mouse pad to selectively retain a beverage container proximate the mouse pad. Fletcher et al. do not suggest a beverage holder for a video monitor according to the claimed invention.

International Patent Application (PCT) Number WO 92/11793, published on Jul. 9, 1992, describes a beverage holder for use in automobiles. PCT '793 does not suggest a beverage holder for a video monitor according to the claimed invention.

Japan Patent Document Number 6-270730, published on Sep. 27, 1994, describes an adjustable beverage holder. Japan '730 does not suggest a beverage holder for a video monitor according to the claimed invention.

None of the above inventions and patents, taken either singularly or in combination, is seen to describe the instant invention as claimed.

SUMMARY OF THE INVENTION

The present invention is a beverage holder for a video monitor, such as a computer monitor, a laptop computer monitor, a television, etc. The beverage holder is either formed integrally with the video monitor or is removably attachable to the video monitor. Several embodiments of a beverage holder are described. Each embodiment includes a generic video monitor with an integral or removably attachable beverage holder for a beverage container which holds hot or cold beverages, such as a cup or mug, or a can of the type used with soft drinks, beer and other beverages which are normally chilled before being served and consumed.

The beverage holder is generally in the form of a relatively thin surface of firm material. The beverage holder may also contain a circular slot for receiving the base of a beverage container and preventing the beverage container from easily spilling over. In addition, the beverage holder may also include known adjustable holding arms to accomodate beverage containers of various sizes. For example, the beverage holder may be insertable into a slot in a side wall or anywhere underneath the video monitor where it can be secured when not in use. The beverage holder may also be attached to a pivotal arm which may be attached to the top of the video monitor. Finally, the beverage holder may be integrally molded into the side wall of the video monitor in the form of a recessed slot which can receive a beverage container. The particular beverage holder geometry and dimensions are variable so as to suit the desires of the user.

Accordingly, it is a principal object of the invention to provide a beverage holder that is attachable or formed integrally with a video monitor.

It is another object of the invention to provide a beverage holder for a video monitor that is readily oriented in a level position with respect to the ground.

It is an object of the invention to provide improved elements and arrangements thereof in a beverage holder for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
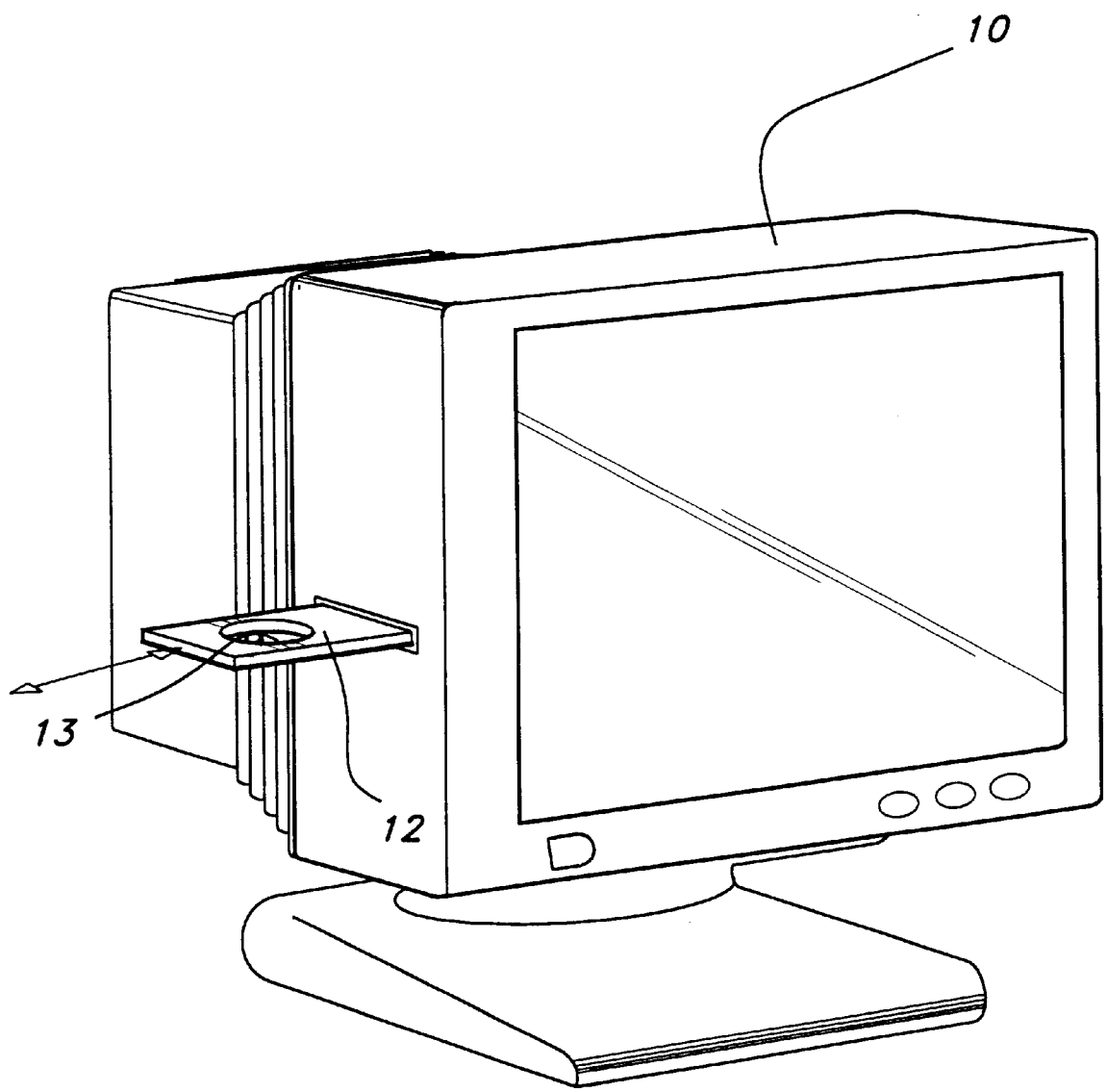
FIG. 1 is a front perspective view of a first embodiment of a generic monitor with an integral cup holder according to the invention.

Continuing now with a more detailed description of preferred embodiments of the present invention, reference is first made to FIG. 1 of the drawings showing a generic video monitor 10 which could be a computer monitor, a laptop computer monitor, a television, etc., with a built in beverage holder 12 for supporting a beverage container (not shown) which could include a variety of hot or cold beverages, such as a cup or mug, or a can of the type used with soft drinks, beer and other beverages which are normally chilled before being served and consumed. The beverage holder 12 is generally in the form of a relatively thin surface of firm material. The beverage holder may also contain a circular slot for receiving the base of the beverage container and preventing the beverage container from easily spilling over. In addition, the beverage holder may also include known adjustable holding arms to accomodate beverage containers of various sizes. The beverage holder 12 is insertable into a slot in the side wall of the video monitor 10 where it can be secured when not in use. Once a user wishes to rest a beverage on the beverage holder 12, the user presses the end of the beverage holder 12 and the beverage holder 12 emerges a few inches from the side wall of the monitor. The particular beverage holder 12 geometry and dimensions are variable so as to suit desires of the user. However, when the beverage holder 12 is installed into the monitor 10 the orientation of the beverage holder 10 is adjusted to ensure that the beverage holder 12 emerges from the side wall in a level orientation so as to safely hold beverages.

Figure 2:
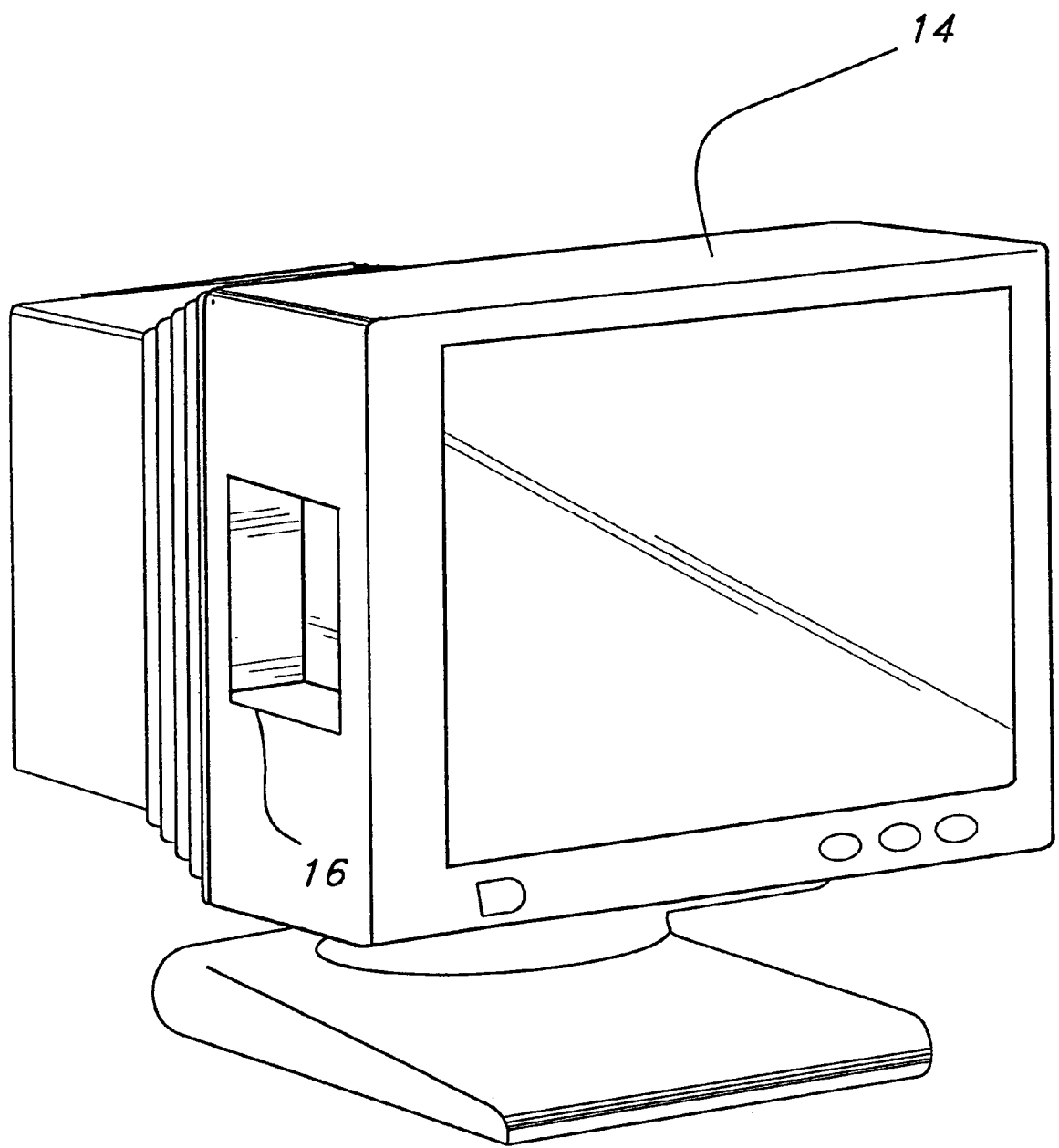
FIG. 2 is a front perspective view of a second embodiment of a generic monitor with an integral cup holder according to the invention.

Referring now to FIG. 2 of the drawings, a second embodiment of a beverage holder 16 is shown integrally formed in the side wall of a video monitor 14, which could be a computer monitor, television, etc. The beverage holder 16 is in the form of a recessed slot in which a user may conveniently insert a beverage container (not shown) which could include a variety of hot or cold beverages, such as a cup or mug, or a can of the type used with soft drinks, beer and other beverages which are normally chilled before being served and consumed. The particular beverage holder 16 geometry and dimensions are variable so as to suit the user. However, when the beverage holder 16 is installed into the monitor the orientation of the beverage holder 16 is adjusted to ensure that the base of the beverage holder 16 is in a level orientation so as to safely hold hot or cold beverages.

Figure 3:
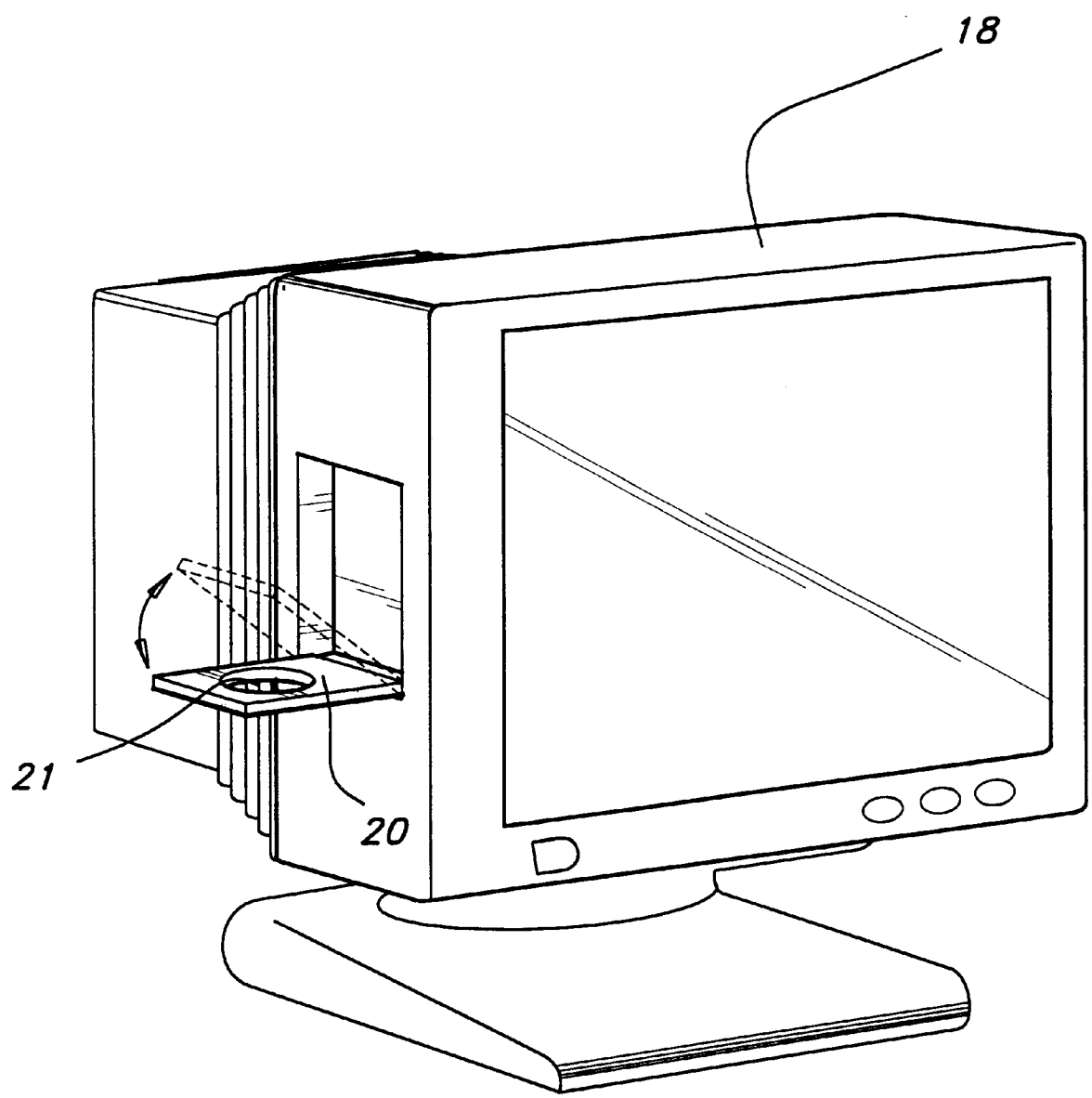
FIG. 3 is a front perspective view of a third embodiment of a generic monitor with an integral cup holder according to the invention.

A third embodiment of a beverage holder 20 is shown in FIG. 3. As shown, a generic video monitor 18 which could be a computer monitor, a laptop computer monitor, a television, etc., includes a beverage holder 20 which is normally secured to the side wall of the monitor 18 that supports a beverage container (not shown) which could include a variety of hot or cold beverages, such as a cup or mug, or a can of the type used with soft drinks, beer and other beverages which are normally chilled before being served and consumed. The beverage holder 20 may be integrally formed in the side wall or may alternatively be attached as an accessory to the video monitor 18. The particular beverage holder 20 geometry and dimensions are variable so as to suit the desires of the user. However, when the beverage holder 20 is installed into the monitor 18 the orientation of the beverage holder 20 is adjusted to ensure that the beverage holder 20 emerges from the side wall in a level orientation so as to safely hold a variety of hot or cold beverages. The beverage holder 20 is in the form of a relatively thin surface of firm material. The beverage holder may also contain a circular slot for receiving the base of a beverage container and preventing the beverage container from easily spilling over. In addition, the beverage holder may also include known adjustable holding arms to accomodate beverage containers of various sizes. The beverage holder 20 flips up into a slot in the side wall of the video monitor 18 where it can be secured when not in use. Once a user wishes to rest a beverage on the beverage holder 20, the user presses the rear side of the beverage holder 20 and the beverage holder 20 flips down from the side wall of the monitor.

Figure 4:
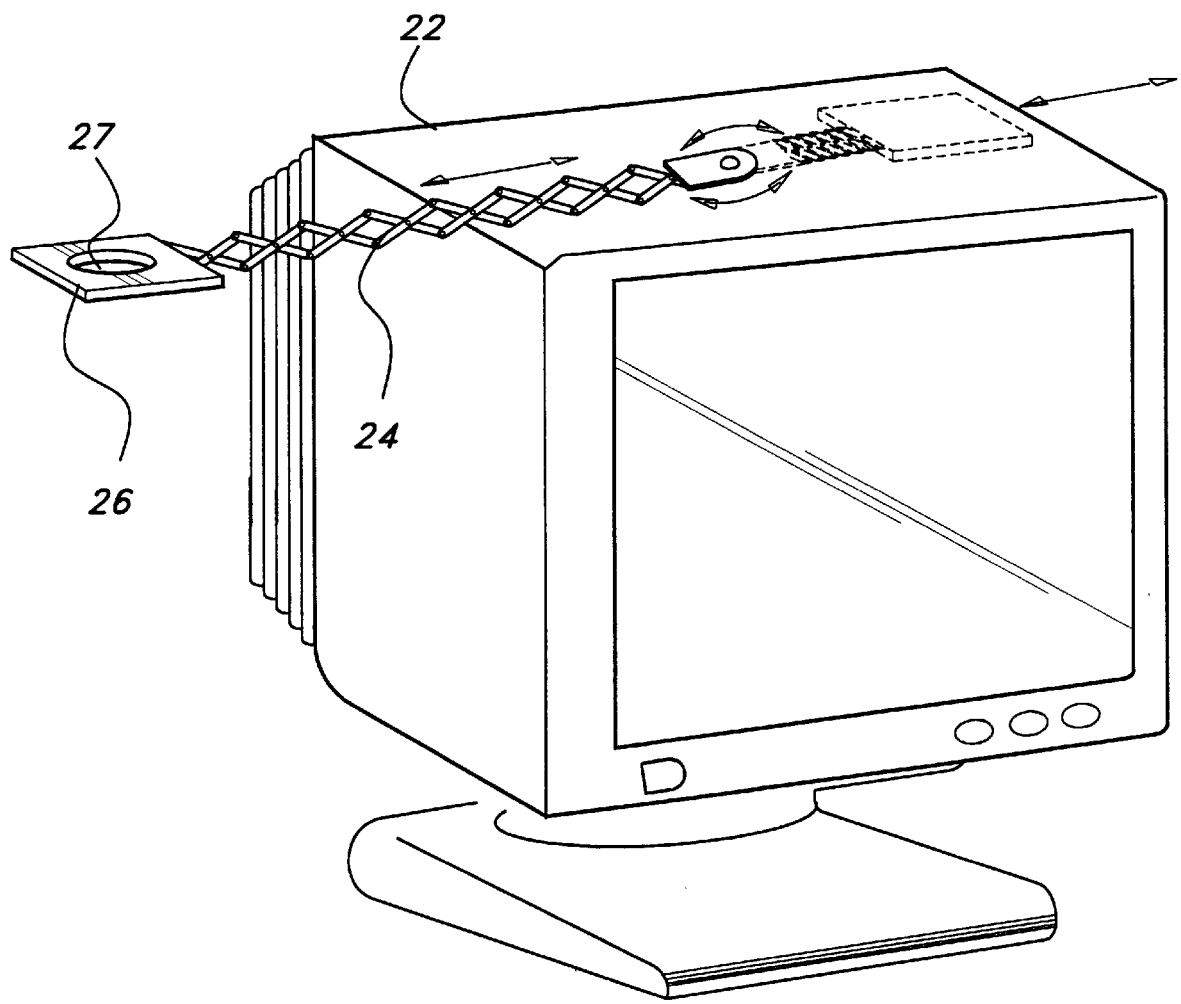
FIG. 4 is a front perspective view of a fourth embodiment of a generic monitor with an attachable cup holder according to the invention.

A fourth embodiment of a beverage holder 26 is shown in FIG. 4. As in the above, a generic video monitor 22 is shown with a beverage holder 26 removably attached by conventional means to the top of the monitor 22 that supports a beverage container (not shown) which could include a variety of hot or cold beverages, such as a cup or mug, or a can of the type used with soft drinks, beer and other beverages which are normally chilled before being served and consumed. The beverage holder 26 is rotatably secured around a pivot point in the center of the top of the monitor 22. The beverage holder 26 is also retractably extendable from the pivot point by a compressible metal mesh 24. Once a user wishes to rest a beverage on the beverage holder 26, the user rotates and extends the beverage holder 26 to a desired position and then rests the beverage on the beverage holder 26. The beverage holder 26 is in the form of a relatively thin surface of firm material. The beverage holder 26 may also contain a circular slot for receiving the base of the beverage container and preventing the beverage container from easily spilling over. In addition, the beverage holder 26 may also include known adjustable holding arms to accomodate beverage containers of various sizes. The particular beverage holder 26 geometry and dimensions are variable so as to suit the desires of the user. However, when the beverage holder 26 is attached onto the top of the monitor 22 the orientation of the beverage holder 26 may be readily adjusted to ensure that the beverage holder 26 resides at a level orientation so as to safely hold a variety of hot or cold beverages.

Figure 5:
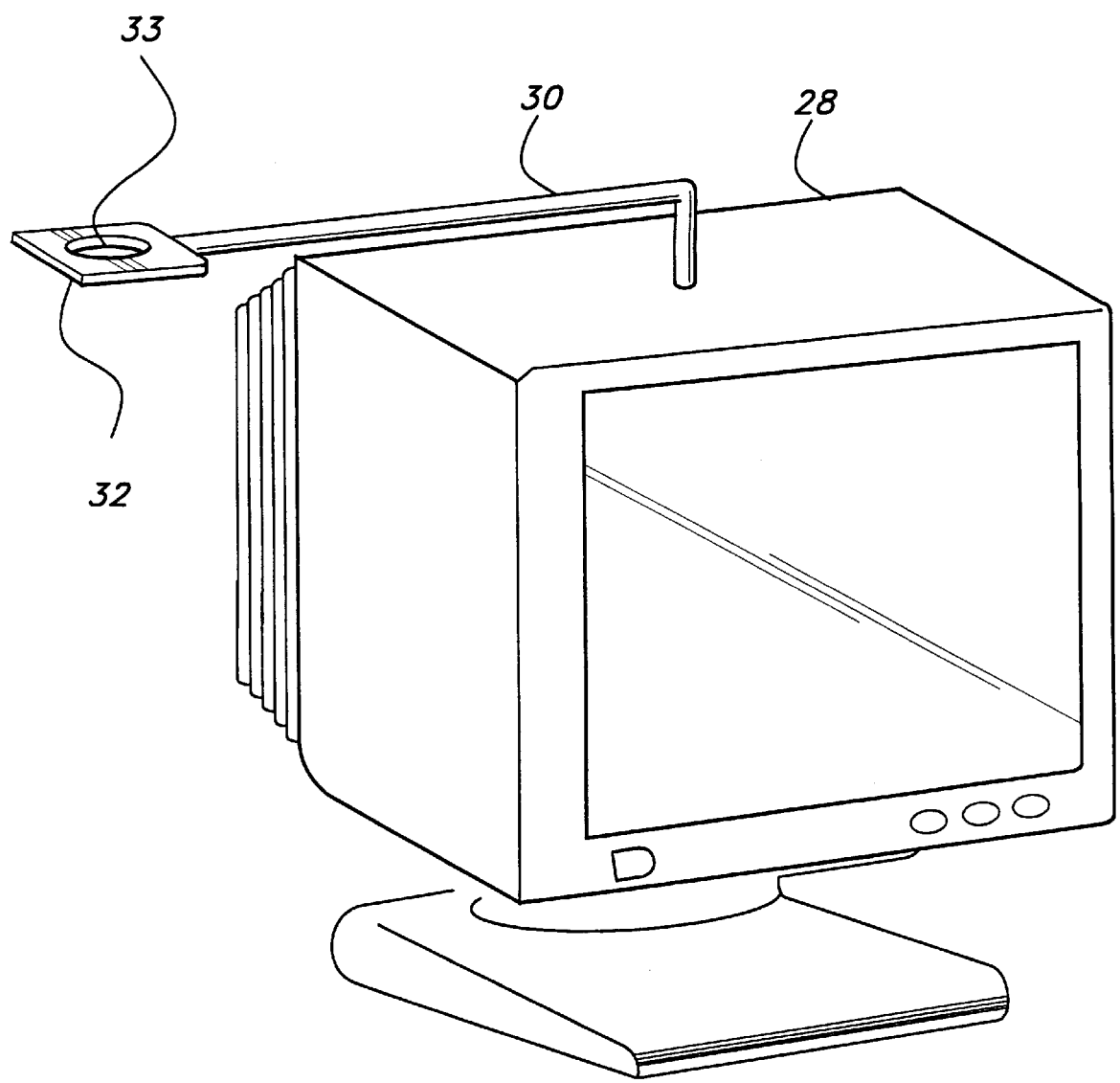
FIG. 5 is a front perspective view of a fifth embodiment of a generic monitor with an attachable cup holder according to the invention.

FIG. 5 of the drawings illustrates a fifth embodiment of a beverage holder according to the invention. A generic video monitor 28 which could be a computer monitor, a laptop computer monitor, a television, etc., includes a beverage holder 32 removably attached by conventional means to the top of the video monitor for supporting a beverage container (not shown) which could include a variety of hot or cold beverages, such as a cup or mug, or a can of the type used with soft drinks, beer and other beverages which are normally chilled before being served and consumed. The beverage holder 32 is in the form of a relatively thin surface of firm material. The beverage holder 32 may also contain a circular slot for receiving the base of the beverage container and preventing the beverage container from easily spilling over. In addition, the beverage holder 32 may also include known adjustable holding arms to accomodate beverage containers of various sizes. The beverage holder 32 is rotatably attached to the top of the video monitor 28 by a rotatable arm 30. When a user wishes to rest a beverage on the beverage holder 32, the user rotates the arm 30 to position the beverage holder 32 to a desired position. The particular beverage holder 32 geometry and dimensions are variable so as to suit the desires of the user. However, when the beverage holder 32 is attached to the top of the monitor 32 the orientation of the beverage holder 32 is readily adjustable to ensure that the beverage holder 32 is at a level orientation so as to safely hold a variety of hot or cold beverages.

Figure 6:
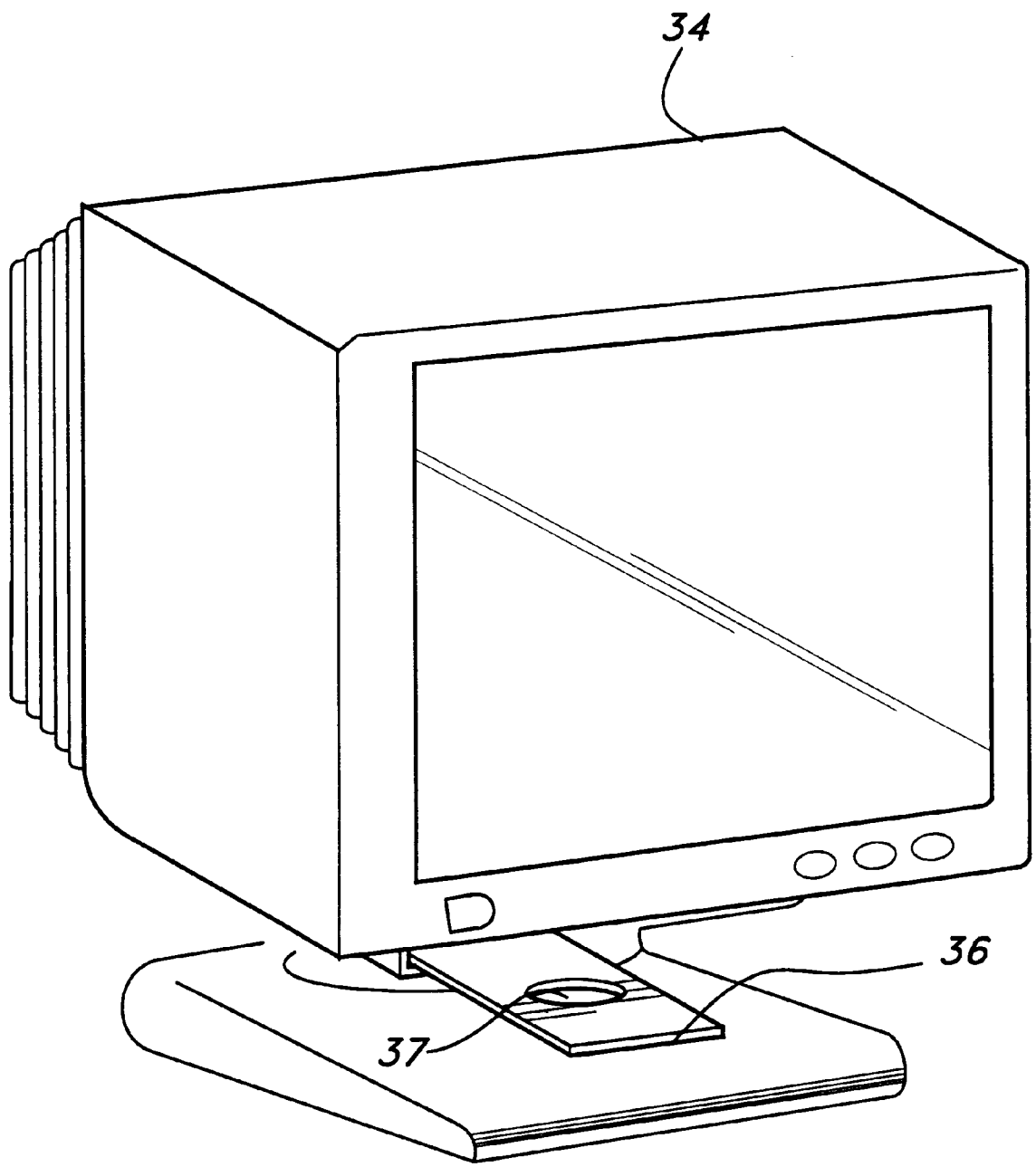
FIG. 6 is a front perspective view of a sixth embodiment of a generic monitor with an attachable cup holder according to the invention.

A final embodiment of a beverage holder 36 is illustrated in FIG. 6. As shown, a generic video monitor 34 includes a removably attachable beverage holder 36 for supporting a beverage container (not shown) which could include a variety of hot or cold beverages, such as a cup or mug, or a can of the type used with soft drinks, beer and other beverages which are normally chilled before being served and consumed. The beverage holder 36 is in the form of a relatively thin surface of firm material. The beverage holder 36 may also contain a circular slot for receiving the base of the beverage container and preventing the beverage container from easily spilling over. In addition, the beverage holder 36 may also include known adjustable holding arms to accomodate beverage containers of various sizes. The beverage holder 36 is insertable into a slot mountable anywhere underneath the monitor, preferably underneath the front of the monitor 34. When a user wishes to rest a beverage on the beverage holder 36, the user presses the end of the beverage holder 36 and the beverage holder 36 emerges a few inches from the beneath the monitor 34. The particular beverage holder 36 geometry and dimensions are variable so as to suit the user. However, when the beverage holder 36 is attached to the monitor 34 the orientation of the beverage holder 36 is adjusted to ensure that the beverage holder 36 emerges from the beneath the monitor in a level orientation so as to safely hold a variety of hot or cold beverages.

It is to be understood that the present invention is not limited to the embodiments described above, but encompasses any and all embodiments within the scope of the following claims.

I claim:

1. A video monitor comprising a beverage holder integrally formed in a side wall of said video monitor, said video monitor including a slot in said side wall, said beverage holder comprising a relatively thin surface of firm material having a circular recess for receiving a base of a beverage container, said beverage holder being removably accessed from said slot.

2. The video monitor according to claim 1, wherein said video monitor is a television.

3. The video monitor according to claim 1, wherein said video monitor is a computer monitor.

4. The video monitor according to claim 1, wherein said video monitor is a laptop computer monitor.

5. A video monitor comprising a beverage holder integrally formed in a side wall of said video monitor, wherein said beverage holder comprises a recessed slot integrally formed in said side wall of said video monitor.

6. A video monitor comprising a beverage holder integrally formed in a side wall of said video monitor, wherein said beverage holder comprises a relatively thin flat surface of firm material adapted to being flipped down from the side wall of said monitor.

7. A video monitor comprising a beverage holder pivotably attached to a center of a top of said monitor, said beverage holder comprises a relatively thin surface of firm material having a circular slot for receiving a base of the beverage container, said beverage holder being secured to a rotable arm.

8. A video monitor comprising a beverage holder pivotably attached to a center of a top of said monitor, wherein said beverage holder comprises a relatively thin surface of firm material having a circular recess for receiving a base of a beverage container, said beverage holder being secured to a retractable metal mesh.

9. The video monitor according to claim 8, wherein said video monitor is a television.

10. The video monitor according to claim 8, wherein said video monitor is a computer monitor.

11. The video monitor according to claim 8, wherein said video monitor is a laptop computer monitor.

12. A video monitor comprising a beverage holder attached to said monitor, wherein said beverage holder comprises a relatively thin surface of firm material having a circular slot for receiving a base of the beverage container, said beverage holder being removably accessed from a slot mounted underneath said video monitor.

13. The video monitor according to claim 12, wherein said slot is mounted underneath a front of said video monitor.

14. The video monitor according to claim 12, wherein said slot is mounted underneath a side of said video monitor.

15. The video monitor according to claim 12, wherein said slot is mounted underneath a rear of said video monitor.

* * * * *